United States Patent [19]
Brück et al.

[11] Patent Number: 5,698,485
[45] Date of Patent: Dec. 16, 1997

[54] PROCESS FOR PRODUCING CERAMIC MICROSTRUCTURES FROM POLYMERIC PRECURSORS

[75] Inventors: Martin Brück, Weilrod; Tilo Vaahs; Wolfgang Böcker, both of Eppstein; Wolfgang Ehrfeld, Mainz; Manfred Lacher, Mainz; Ludwig Giebel, Mainz, all of Germany

[73] Assignees: Hoechst Aktiengesellschaft, Frankfurt am Main; Institut Fuer Mikrotechnik GmbH, Mainz, both of Germany

[21] Appl. No.: 589,414

[22] Filed: Jan. 22, 1996

Related U.S. Application Data

[63] Continuation of Ser. No. 241,369, May 12, 1994, abandoned.

[30] Foreign Application Priority Data

May 14, 1993 [DE] Germany .......................... 43 16 184.7

[51] Int. Cl.⁶ ........................................ C04B 35/64
[52] U.S. Cl. ................... 501/87; 501/88; 501/96; 501/97; 501/127; 264/60; 264/401; 264/430; 264/434
[58] Field of Search ........................ 501/133, 153, 501/154, 87, 88, 96, 97, 127; 264/401, 430, 434, 60

[56] References Cited

U.S. PATENT DOCUMENTS

| | | | |
|---|---|---|---|
| 3,853,567 | 12/1974 | Verbeek . | |
| 4,097,294 | 6/1978 | Rice et al. | 501/88 |
| 4,105,455 | 8/1978 | Koga et al. | 501/88 |
| 4,497,787 | 2/1985 | Schilling, Jr. et al. | 501/88 |
| 4,595,472 | 6/1986 | Haluska | 501/88 |
| 4,631,260 | 12/1986 | Bartos et al. | 501/88 |
| 4,668,642 | 5/1987 | Buljaski | 501/88 |
| 4,689,252 | 8/1987 | Letrun et al. | 501/88 |
| 4,801,477 | 1/1989 | Fudim | 264/401 |
| 5,002,854 | 3/1991 | Fan et al. | 264/401 |
| 5,171,722 | 12/1992 | Toreki et al. | 501/88 |
| 5,208,192 | 5/1993 | Yu et al. | 501/88 |
| 5,278,110 | 1/1994 | Toreki et al. | 501/88 |
| 5,352,310 | 10/1994 | Natter | 264/401 |
| 5,494,618 | 2/1996 | Sitzmann et al. | 264/401 |
| 5,506,087 | 4/1996 | Lapin et al. | 264/401 |

FOREIGN PATENT DOCUMENTS

| | | |
|---|---|---|
| 0 240 796 | 10/1987 | European Pat. Off. . |
| 0 466 055 | 1/1992 | European Pat. Off. . |
| 0468 066 | 9/1992 | European Pat. Off. . |

OTHER PUBLICATIONS

W. Ehrfeld et al., "Three–dimensional Microfabrication Using Synchrotron Radiation", Nuclear Instruments and Methods in Physics Research A303, Section V, (1991) pp. 523–531.

Micro Parts: Die Liga–Technik, pp. 3–23 (1994).

*Primary Examiner*—Paul Marcantoni
*Attorney, Agent, or Firm*—Foley & Lardner

[57] ABSTRACT

A process for producing a ceramic having a microstructured surface with a surface profile depth of less than 1 micron, measured by the atomic force microscopy, comprising preparing a polymeric precursor material, shaping the precursor material into a structured mold insert of an inherently stable mold insert material having a structured surface geometry corresponding with the microstructured surface of the ceramic to form a shaped precursor material, the shaped precursor material being rendered infusible by chemical crosslinking, and wherein the inherently stable mold insert material is selected from materials having sufficient strength for structuring and high molding accuracy, and pyrolyzing the shaped precursor material, whereby the ceramic having the microstructured surface is obtained.

19 Claims, 9 Drawing Sheets

Schematic representation of the process of the invention

Figure 1:
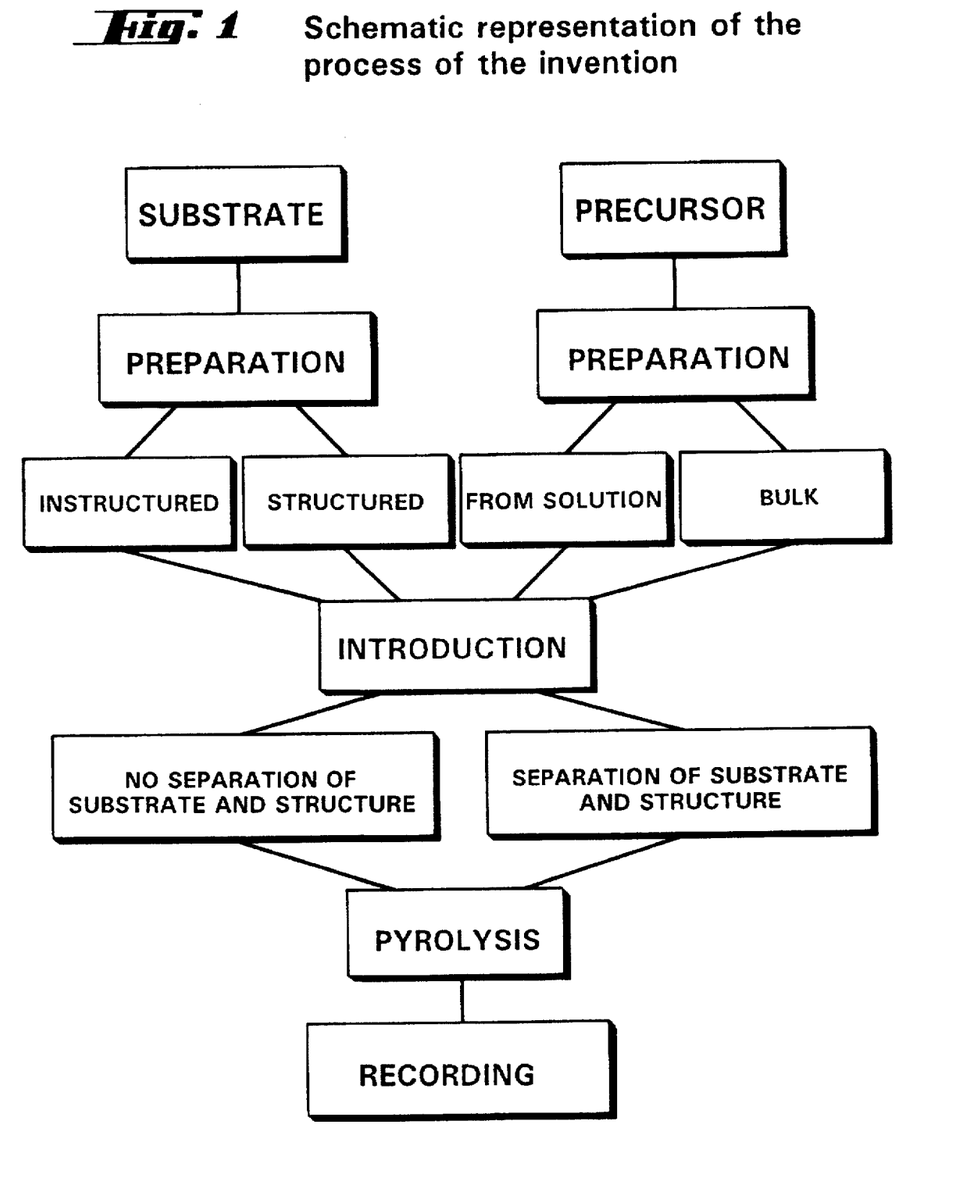

Fig. 1 Schematic representation of the process of the invention

PROCESS FOR PRODUCING CERAMIC MICROSTRUCTURES FROM POLYMERIC PRECURSORS

This application is a continuation of application Ser. No. 08/241,369, filed May 12, 1994 now abandoned.

The present invention relates to a process for producing ceramic microstructures.

For a very wide variety of industrial applications both in the area of microelectronics, microoptics, micromechanics, microfluidics and also for use in separating mixtures of materials it is becoming increasingly necessary to provide suitable ultraprecise microstructures, either as substrate materials or as functional materials, which in increasing measure have thermal and oxidative stability and at the same time should be resistant to aggressive chemicals. Although organic polymers allow microstructures having sufficient precision to be produced, the polymeric materials are attacked by numerous chemicals and furthermore their stability is ensured only within a certain temperature range. These disadvantages can be circumvented by suitable ceramic materials, in particular when the application necessitates high temperatures and/or aggressive chemical conditions. However, ceramic materials mostly exist as powder and in this aggregate state cannot be readily shaped into the ultraprecise microstructures; indeed, they frequently still alter their external geometry during the sintering procedure.

The production of such ceramic microstructures via processes such as tape casting, stamping, slip casting or micro-injection molding using powder technology has been known for a short time. A relevant literature reference which may be cited is: German company report: Micro Parts: "Die Liga-Technik".

The disadvantage of the ceramic microstructures produced via powder technology is caused by the limited reproduction accuracy. The reason for this is that the starting materials are ceramic powders which, by their nature, possess a certain primary particle size which even increases further during sintering as a result of grain growth. Directly associated therewith is a decline in the reproduction accuracy because of the surface roughness occurring on the ceramic microstructure.

For some time there have been compounds known which make possible the production of ceramic components from preceramic polymers by means of pyrolysis. A relevant literature reference which may be cited is EP-A-0 466 055. For example, polysilazanes can be processed into structures of silicon carbonitride and silicon nitride ceramics. Polysilanes and polycarbosilanes can be used as precursor systems for producing silicon carbide ceramics. Silicon carbide, silicon nitride and silicon carbonitride, both as pure materials and also as thin layers, have excellent thermal and oxidative stability and additionally are inert towards aggressive chemicals.

For shaping the precursor materials, the best prospects are offered by the LIGA method which is a combination of lithography, electroforming and molding. It is described in Nuclear Instruments and Methods in Physics Research A 303 (1991) pages 523–535, North Holland, in the section "Three-dimensional microfabrication using synchrotron radiation" (W. Ehrfeld and D. Münchmeyer), and allows ultraprecise structures to be produced in large numbers. In particular, the use of polymeric starting materials opens up many possible applications.

It is therefore an object of the present invention to develop a novel process using which pyrolysis of suitable precursors allows ceramic microstructures having ultraprecise geometry, i.e. a surface roughness <1 µm (as fired), to be produced from the correspondingly shaped precursor materials, which microstructures possess excellent thermal and oxidative stability and in addition are inert toward aggressive chemicals.

This object is achieved by a process as claimed in claim 1, the more detailed embodiments of which are given in claims 2 to 11.

Preferably the shaped precursor material is, prior to pyrolysis, made infusible by an additional treatment step, which is usually achieved by crosslinking the shaped material.

Suitable inherently stable mold insert materials are in particular those materials which have sufficient strength for the structuring procedure and should be such that a high molding accuracy can be achieved. For the purposes of the present invention, the mold insert materials used can in principle be polymeric materials such as polytetrafluoroethylene (PTFE), polycarbonate (PC) or polymethyl methacrylate (PMMA), metallic materials such as aluminum, copper or ferrous alloys, but also glass or ceramic, with polymeric materials being preferred in the simplest case. For specific applications, the mold inserts used can also comprise semiconductor materials such as, for example, silicon, the structure of which is produced by anisotropic wet chemical etching or by dry etching.

The structuring of the inherently stable mold insert material is preferably carried out, as already mentioned, by means of the LIGA method. Here, in the lithographic structuring method, use is made of high-energy radiation, for example UV radiation, X-rays or ion beams, to which, for example, polymeric layers are exposed. The irradiated or non-irradiated regions are then removed with a developer liquid and nickel or another material can then be electrodeposited on the template formed, which finally leads to a master template or, more generally, to a mold.

However, for a simple geometry structuring can also be carried out by machining, for example by means of a wafer saw using blade widths in the range from 15 to 300 µm. The use of saw blades of various widths in combination with parallel, directly adjacent cuts allows a great variety of simple geometric shapes to be obtained. Further structuring possibilities result from the superposition of simple geometric shapes, such as, for example, by cuts placed crosswise above one another. If the wide cuts are placed deeper than the narrow ones, there results a crosswise mesh structure having finer and thicker ribs, in which the finer ribs are bound to the thicker ones.

For the purposes of the present invention, suitable precursor materials are all materials which can be shaped and pyrolytically decomposed to ceramic. Such precursor materials are, for example, polysilazanes, polycarbosilanes, polysilanes or polysiloxanes, or else polymers which do not contain silicon, such as, for example, borazines or organoaluminum polymers. The ceramic materials produced therefrom can be element combinations such as, for example, SiC, SiN, SiNC, SiCO, AlN, SiBN or SiBNC. Polyvinylsilazanes, as are commercially available under the designation "VT-50" by Hoechst AG in Frankfurt/M., have proven particularly useful for the purposes of the present invention. These polyvinylsilazanes have the following composition:

| Element  | Proportion (% by weight) |
|----------|--------------------------|
| Silicon  | 35.9                     |
| Nitrogen | 26.6                     |
| Carbon   | 31.2                     |
| Hydrogen | 5.7                      |
| Oxygen   | <0.6                     |

The preparation of the precursor materials can be carried out in very different ways. For example, the materials can first be subjected to a purification step, followed by melting, dilution with solvent or concentration of material already dissolved in solvent.

The polyvinylsilazane already mentioned is supplied as a solution in tetrahydrofuran (THF) and is a low-viscosity, slightly yellowish liquid having a THF content of 50% by weight. For molding in the context of the invention, this solvent content is too high for microstructuring to be able to be carried out. The polymer solution is therefore concentrated by charging the solution into a Schlenk tube and reducing the THF content by passing in argon. The passing-in of inert gas effectively avoids the undesired contact of the material with the atmospheric oxygen of the surroundings. The material concentrated to a solvent content in the range from 20 to 35% by weight can still be used after a number of days without loss in quality.

A further way of obtaining suitable molding material of polyvinylsilazane "VT-50" is in principle to completely remove the solvent content by heating, so that only bulk material remains. The bulk material can subsequently be melted and introduced into the corresponding mold. However, since a complicated heating apparatus has to be provided for melting and since the material has to be processed in as short as possible a time to avoid losses in quality, processing in solution is the preferred variant according to the invention.

Shaping of the microstructures to be produced is achieved by the corresponding structuring of the mold insert which thus contains the negative of the microstructure. The actual shaping of the microstructures is carried out by introducing the precursor material into the structured mold insert. The introduction can be carried out by casting, pressing, spraying, injection molding, microinjection molding or stamping. For molding, the various mold inserts of PTFE, PC, PMMA, aluminum or glass are advantageously inserted into a mounting. The concentrated precursor material is introduced into the mold insert, then the solvent is removed by outward diffusion. Since the polymer material hydrolyzes easily, this preparation step should also be carried out under inert gas, preferably under argon.

In practice it is found that mold inserts of PTFE and PMMA are preferable for the production of the microstructures of polyvinylsilazane according to the invention; materials such as polycarbonate, aluminum or glass in combination with polyvinylsilazane more easily lead to losses in quality.

The shaped precursor materials are preferably taken out of the structured mold insert material and made infusible in an additional treatment step. For this purpose, the shaped precursor materials can be crosslinked either chemically, for example by hydrolysis, or with the aid of actinic radiation, preferably thermally.

To enable the effect of the mold insert material during pyrolysis to be assessed, some of the microstructures are carefully removed from the mold insert so that samples both with and without mold insert are available. For samples which are pyrolyzed with the mold insert, the mold insert material is destroyed by pyrolysis and the mold is lost.

Pyrolysis is carried out in a gastight firing furnace in vacuo or in an inert gas atmosphere. The samples are heated at a heating rate in the range from 0.1 to 10 K/min, preferably from 0.5 to 4 K/min, to a temperature in the range from 700° to 2000° C., preferably from 900° to 1400° C. In the simplest case, the end temperature is approached at a constant heating rate and then kept constant for a period of from 0 to 180 min, preferably from 15 to 120 min. During pyrolysis, the mold insert material is degraded and the precursor material is converted into a ceramic. The process procedure can be optimized further to achieve uniform loss in mass, in particular, to avoid cracks in the ceramic material, the heating rate can be slowed down at certain temperatures to prevent the pyrolysis reaction from proceeding too violently. More details of this procedure can be found in DE-A-37 37 921.

The process of the invention, which is shown once more schematically in the attached FIG. 1, offers a promising starting-point for producing ceramic microstructures having ultrahigh precision from polymeric precursors. The type of molding of the invention makes it possible to reproduce with high precision even the finest contours of the mold insert. Control of the loss in mass of the mold insert material during pyrolysis via the process procedure can effectively prevent the formation of cracks in the ceramicized microstructures.

Targeted surface treatment also enables other mold insert materials to be successfully made usable for the process of the invention. Mold insert materials of metal or glass can be coated by a plasma treatment of their surfaces. This enables mold insert and structure to be more easily separated from one another. Good results are also achieved by coating the mold insert surface with a noble metal.

If the precursor material is sufficiently viscous, it is possible to produce microstructures without solvent and thus also to carry out micro-injection molding and micro-stamping processes.

Owing to the hardness, the thermal and chemical stability and the relatively low specific gravity, ceramic microstructures such as can be produced by means of the process of the invention have many uses.

Particularly promising is the production of microfiltration elements for use in chemically aggressive liquids at high temperatures. Similarly high demands are often also made of components in electronic and optical construction and connection technology, of components in microfluidics, or in fuel injection technology, with a particularly precise molding accuracy also being required.

Complex microsystems generally comprising sensors, microactuators, information processing with peripheral equipment and the interface, will soon gain substantial importance, inter alia in areas of analytical processes in chemistry and molecular biology. Closely related thereto is the application area of sensor technology. Even today there is interest in microstructures which can be used for measuring optical, mechanical, electrical and chemical parameters and which can be integrated into intelligent systems on a very small scale.

Owing to their specific properties, ceramic materials are also indispensable for microstructures which are to be used in components for microwave technology. They are also suitable for mounting structures in components for integrated optics. Their use can also be envisaged in 3d-packaging components in microelectronics and for structures in displays of flat VDUs.

The process of the invention shows that preceramic polymers are suitable for the molding of ceramic microstructures, a surprisingly high molding accuracy of the given structures being achieved. The ceramic surface obtained surprisingly shows an exceptionally low surface roughness. The great variety of possible industrial applications of structures produced according to the invention, in particular using the whole LIGA process, promises rapid transfer of the process of the invention into practice.

The invention is illustrated below by way of example, without it being limited to the concrete embodiments presented. The preparation process of the invention could be satisfactorily carried out particularly for mold inserts of PTFE and PMMA. In none of the examples is the formation of flaws resulting from the preparation from the polysilazane solution observed. The following results are obtained for the individual materials:

EXAMPLE 1

PTFE

In principle, the production of polymer-ceramic microstructures using PTFE as mold insert material leads to satisfactory results. The introduction of cuts proves to be difficult, the material moves away from the wafer saw at very small channel widths and crosswise channel patterns cannot be readily produced. As expected, the polymeric structures of polyvinylsilazane can easily be demolded.

EXAMPLE 2

PMMA

PMMA gives the best results as mold insert material. In structuring, the higher strength compared with PTFE enables even very sharp contours to be produced, the contours of the wafer saw blade being clearly reproduced at the bottom of the channel. The use of PMMA is also favorable in respect of pyrolysis. However, the demolding of the structure from the mold insert proves to be more difficult than for PTFE.

EXAMPLE 3

Behavior of the samples during pyrolysis

Pyrolysis can be carried out without problems under the following conditions:

Heating rate: 1 K/min
Final temperature: 1000° C.
Hold time: 1 h
Furnace atmosphere: $N_2$ The mold insert is previously removed from the sample.

In the samples pyrolyzed together with the mold insert there are, however, deleterious effects as a result of the different material properties. During pyrolysis, the polyvinylsilazane undergoes appreciable volume shrinkage. To allow this shrinkage to proceed without stresses, it must not be hindered by the mold insert material. If the shrinkage of the polyvinylsilazane occurs more quickly than the degradation of the mold insert material as a result of pyrolysis, stresses arise which in turn lead to the formation of cracks in the microstructure.

To understand the course of events, the various stages of the experiment were recorded by scanning electron micrographs for the example of a basic structure produced on a PMMA mold insert.

The micrographs followed the order of the production process and show:

the structured PMMA mold insert, the unpyrolyzed polymeric microstructure,
the pyrolyzed ceramic microstructure.

The high reproduction accuracy achieved in the ceramic structures produced was confirmed by measurement of the surface roughness with the aid of atomic force microscopy (AFM) and the profilometer measurement method.

Subsequently, the composition of the finished ceramic microstructure was determined.

Figure 2:
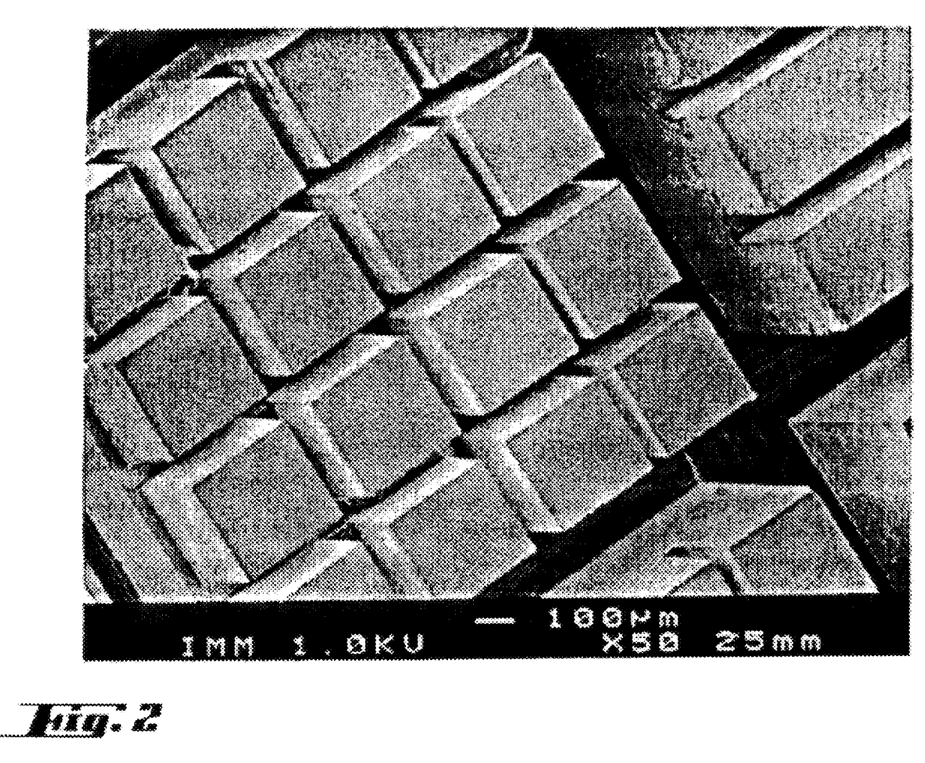
Figure 3:
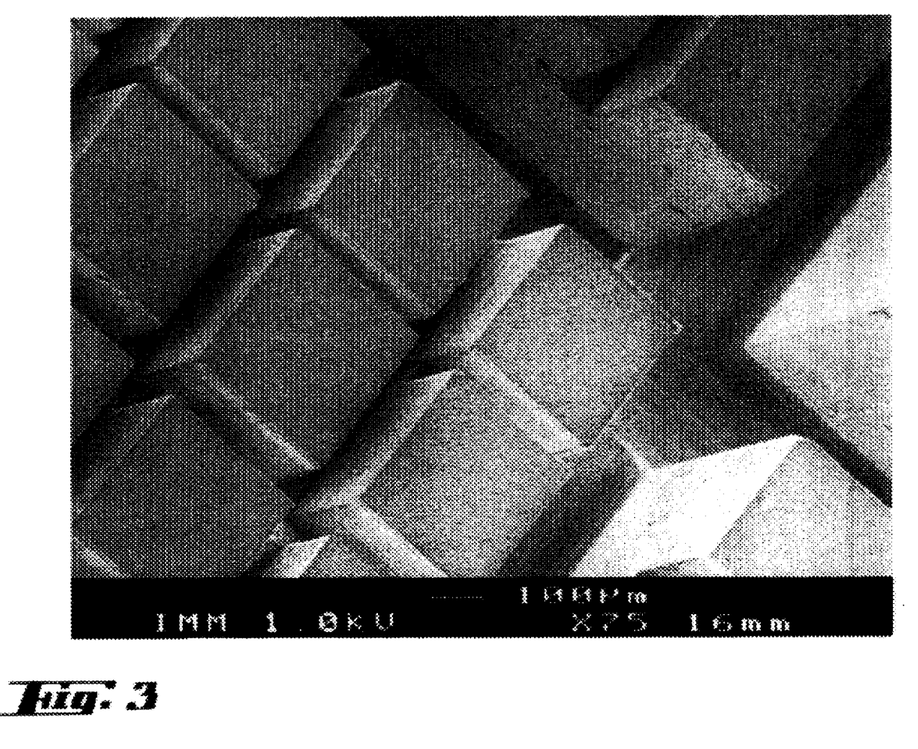

FIGS. 2 and 3 show scanning electron micrographs of the structured PMMA mold insert. A crosswise mesh structure having thicker and finer ribs serves as example. The micrograph of a mesh structure segment of the structured PMMA mold insert having the finer cuboid structure in the vertical top view is shown in FIG. 2. Width and depth of the channels are 324 and 300 μm respectively for the larger cuboid structure, 100 μm and 120 μm respectively for the finer cuboid structure. The channel depths indicated result from the settings of the wafer saw. FIG. 3 shows a picture taken at an angle of 20°, with the formation of cutting grooves at the bottom being clearly recognizable.

Figure 4:
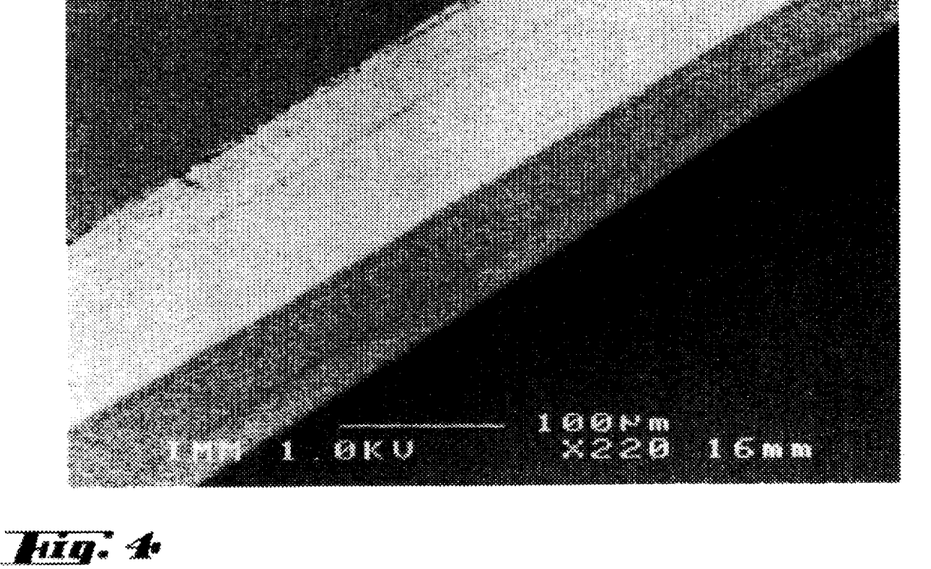
Figure 5:
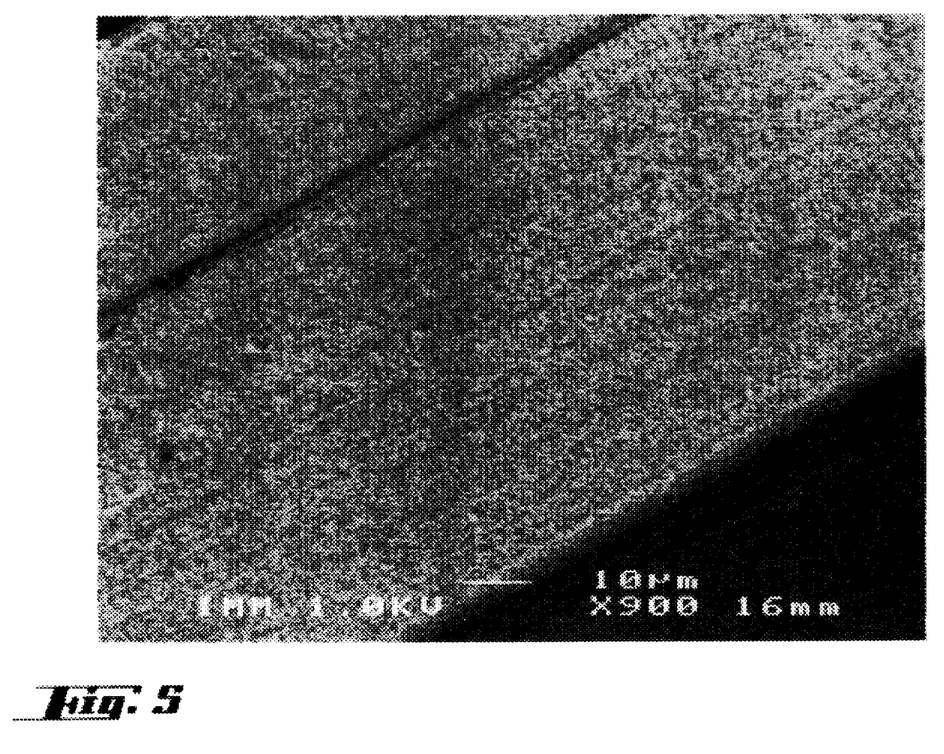
Figure 6:
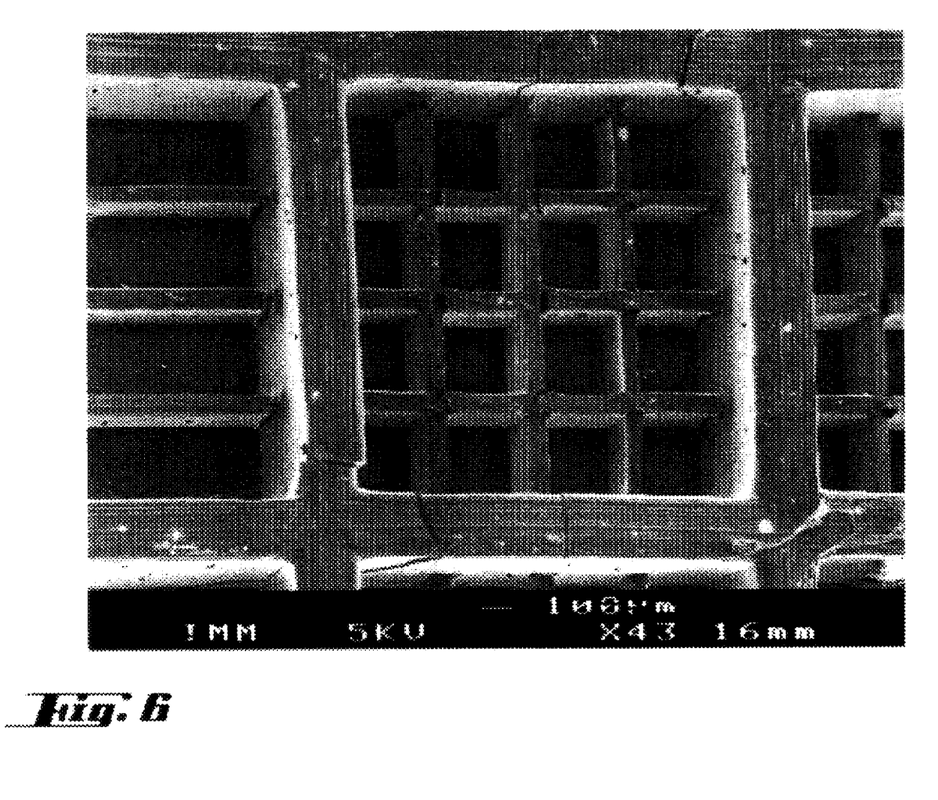

FIGS. 4 and 5 show scanning electron micrographs of the unpyrolyzed polymeric structure. The polymeric microstructure demolded from the mold insert and not yet pyrolyzed is shown in FIG. 4. The micrograph shows a detail of a beam 100 μm wide and 100 μm thick. The exceptionally high precision of molding leads to the reproduction even of details of the sawing process in the molded polymeric microstructure. In the highly magnified section of a beam shown in FIG. 5, the traces of two successive saw cuts can be clearly recognized in the form of a cutting groove. The groove, which appears in the surface of the beam, can be attributed to the second, offset cut made with the wafer saw.

Figure 7:
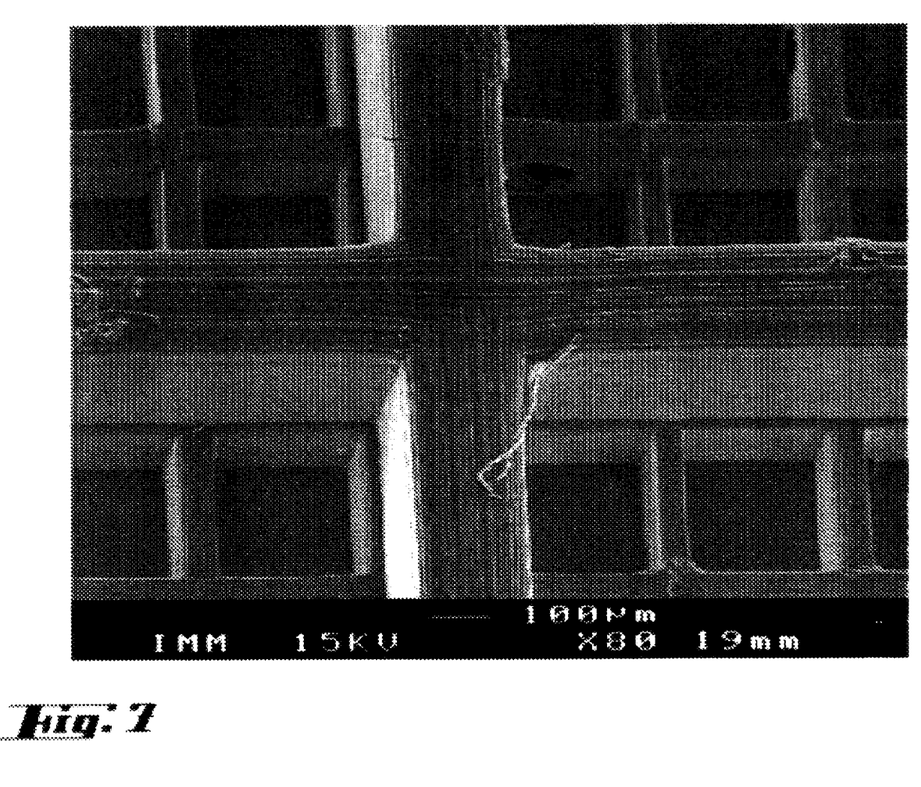
Figure 8:
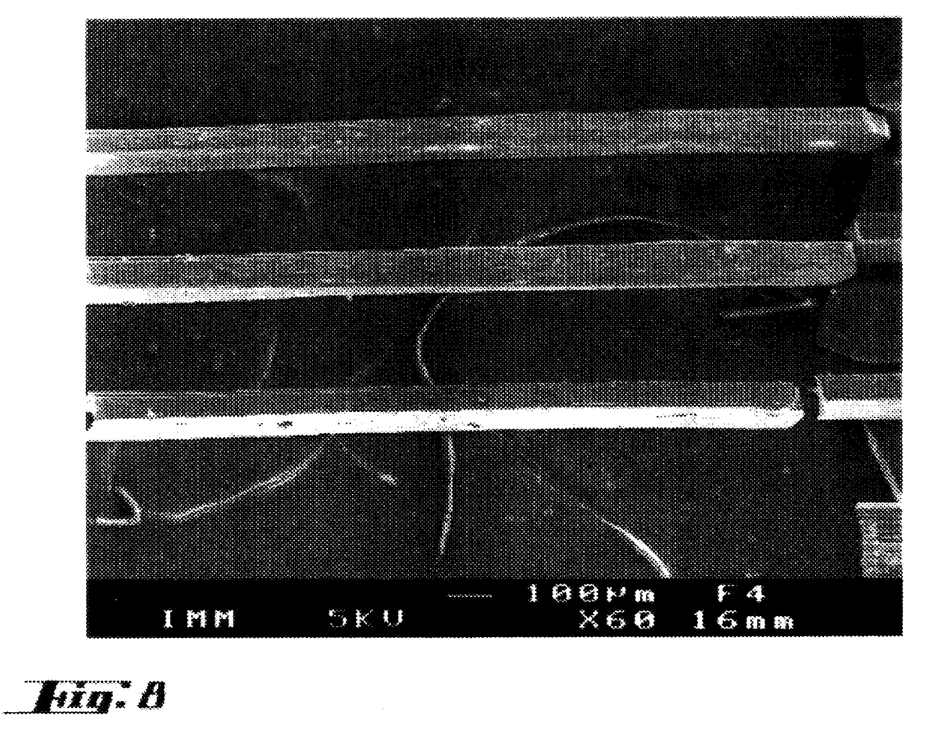

FIGS. 6 to 9 show scanning electron micrographs of the ceramic microstructure which results from the production process of the invention. A microstructure obtained after joint pyrolysis and subsequent separation of PMMA mold insert and ceramicized polymer is shown in overview in FIG. 6. In this figure the characteristic mesh structure having rib widths of 220 μm and 67 μm respectively and rib thicknesses of 214 μm and 85 μm respectively, corresponding to the superposition of the large and small channels sawn out of the mold insert, can be clearly seen. FIG. 7 shows a magnified section of the surface of a rib 220 μm wide, in which the contouring of the beam surface caused by the wafer saw blade is again clearly visible.

Figure 9:
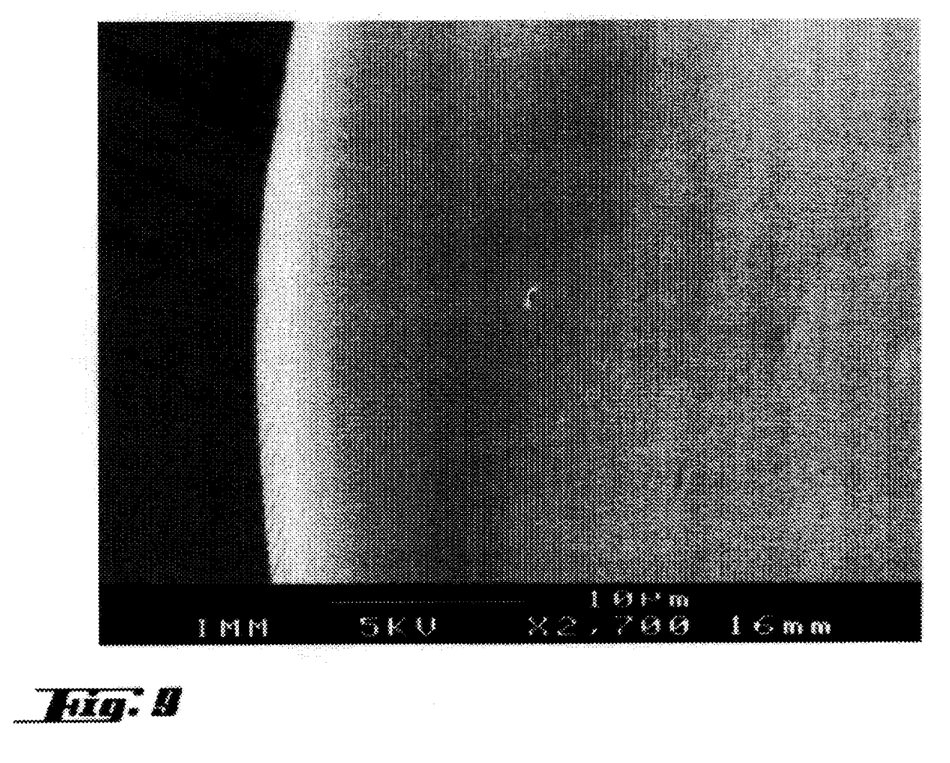

During the joint pyrolysis of polymer material and mold insert, damage to the microstructures can occur. The freestanding ribs 59 μm wide and 90 μm thick after fracture of such a structure are recorded in FIG. 8. The magnified section of such a fracture surface is shown in FIG. 9. This shows that despite the mechanical load, a flaw-free surface results on fracture.

An investigation for determining the surface roughness was carried out on the microstructures produced for the scanning electron micrographs.

To demonstrate and verify the ultraprecise reproduction accuracy of the microstructures produced, surface roughness measurements were carried out on the ceramic of the invention. For comparison, the silicon nitride ceramic conventionally produced via powder technology was also examined.

Two different measurement methods were used:
a) Profilometer
Model of apparatus: α-step 200; from Tencor
Length of scan: 80 μm
Resolution: 0.5 nm vertical 40 nm horizontal
b) Atomic force microscope (AFM)

Model of apparatus: SFM-BD2; from Park Scientific Instruments
Scan area: 5 μm×5 μm and 0.75 μm×0.75 μm
Resolution: 0.004 nm vertical
Max. vertical step: 2 μm The surface roughness result is given as the maximum height difference, the peak-to-valley height.

|  | **Conventional ceramic (as fired) | Ceramic of the invention | Standard deviation from the mean |
|---|---|---|---|
| Profilometer | 3.8 μm | 149 nm |  |
| Atomic force microscope |  |  |  |
| Scan 5 × 5 μm² | n.m.* | 111 nm | 13.4 nm |
| Scan 0.75 × 0.75 μm² | n.m.* | 17.3 nm | 2.4 nm |

*n.m. = not measurable, since surface roughness is too high (> 2 μm).
**Conventionally produced silicon nitride ceramic, pressure sintered, average grain size 0.5 μm, from Ube.

The analysis of the sample composition after pyrolysis gave the following element proportions (% by weight):

| Si: | 42% |  |
| N: | 28% | ±2% |
| C: | 28% |  |
| O: | 2% |  |

The following parameters were then measured on the samples produced:

Oxidation resistance: determined by heating the sample to a temperature of 1400° C. in an air atmosphere for 1 hour. The loss in mass was ≦1% by weight.

Thermal stability: >1600° C.;

Phase composition: up to a temperature of 1500° C. in an inert gas atmosphere, hold time 1 hour, the pyrolysis product is amorphous according to X-rays, i.e. the crystallite size is less than 5 nm, from 1600° C. some crystallization of $\alpha$-Si$_3$N$_4$ and $\beta$-SiC is observed, the average crystallite size being about 20 nm. The X-ray diffraction studies were carried out using a Siemens diffractometer, radiation source CU$_{K\alpha}$.

Chemical resistance:
20% NaOH 100 h boiling point→Am =0.1% by weight,
20% HCl 100 h boiling point→Am =0.06% by weight,
conc. HNO$_3$ 100 h boiling point→Am=0.006% by weight,
conc. H$_2$SO$_4$ 100 h boiling point→Am=1.3% by weight.

We claim:

1. A process for producing a ceramic having a microstructured surface with a surface profile depth of less than 1 μm, measured by atomic force microscopy, comprising
   preparing a polymeric precursor material,
   shaping the precursor materially introducing the precursor material into a structured mold insert of an inherently stable mold insert material having a structured surface geometry corresponding with the microstructured surface of the ceramic to form a shaped precursor material, the shaped precursor material being rendered infusible by chemical crosslinking, and wherein the inherently stable mold insert material is selected from materials having sufficient strength for structuring and high molding accuracy, and
   pyrolyzing the shaped precursor material, whereby the ceramic having the microstructured surface is obtained.

2. The process as claimed in claim 1, wherein the polymeric precursor material is selected from the group consisting of polysilazanes, polycarbosilanes, polysilanes, polysiloxanes, and polymers which do not contain silicon.

3. The process as claimed in claim 2, wherein the polymeric precursor material is polyvinylsilazane wherein said polyvinylsilazane is introduced as a solution in tetrahydrofuran having a solvent content of 50% by weight.

4. The process as claimed in claim 1, wherein the preparation of the precursor materials is carried out by melting, dilution with solvent or thickening.

5. The process as claimed in claim 1, wherein active and non-active fillers are added for the preparation of the precursor material in an amount of from 0 to 60% by volume, based on the total volume of the mixture.

6. The process as claimed in claim 3, wherein for the preparation of the precursor material the solvent content is reduced to an amount in the range from 20 to 35% by weight by passing in inert gas.

7. The process as claimed in claim 1, wherein the shaping of the microstructures is carried out by introducing the precursor material into the structured mold insert by casting, pressing, spraying, injection molding, micro-injection molding or stamping and any solvent is then removed by outward diffusion.

8. The process as claimed in claim 1, wherein the pyrolysis is carried out in a gastight firing furnace in vacuo or in an inert or reactive gas atmosphere, and wherein the shaped microstructures are heated to a temperature in the range from 700° to 2000° C., at a heating rate of from 0.1 to 10 K/min and the final temperature is kept constant for a period of from 0 to 180 min.

9. The process as claimed in claim 1, wherein the ceramic resulting from the pyrolysis comprises carbides, nitrides, borides, oxides and mixtures thereof.

10. The process as claimed in claim 1 wherein the shaped precursor material is made infusible by chemical crosslinking by means of hydrolysis of actinic radiation.

11. The process as claimed in claim 1 wherein the inherently stable mold insert material is selected from the group consisting of polytetrafluoroethylene, polycarbonate and polymethlymethacrylate.

12. The process of claim 8, wherein the shaped microstructures are heated to a temperature in the range from 900°–1400° C.

13. The process of claim 8 wherein the final temperature is kept constant for a period of from 15 to 120 minutes.

14. The process of claim 9, wherein the ceramic resulting from the pyrolysis comprises elemental combinations of at least two of Si, N, C, O, B, and Al.

15. The process as claimed in claim 2 wherein the polymeric precursor material is selected from the group consisting of borazines and organoaluminum polymers.

16. A process for producing a ceramic having a microstructured surface with a surface profile depth of less than 1 μm, measured by atomic force microscopy, comprising
   preparing a polymeric precursor material,
   shaping the precursor material by introducing the precursor material into a structured mold insert of an inherently stable mold insert material having a structured surface geometry corresponding with the microstructured surface of the ceramic to form a shaped precursor material, said shaped precursor material being rendered infusible by chemical crosslinking, and the inherently stable mold insert material having a structured surface geometry being formed by means of the LIGA method wherein a combination of lithography, electroforming and molding is used, and
   pyrolyzing the shaped precursor material, whereby the ceramic having the microstructured surface is obtained.

17. A process as claimed in claim 1, wherein the ceramic has a surface roughness peak-to-valley height of less than or equal to 0.149 µm as measured by a profilometer.

18. A process as claimed in claim 16, wherein the ceramic has a surface roughness peak-to-valley height of less than or equal to 0.149 µm as measured by a profilometer.

19. A process for producing a ceramic having a microstructured surface with a surface profile depth of less than 1 µm, measured by atomic force microscopy, comprising preparing a polymeric precursor material, preparing a structure mold insert of an inherently stable mold insert material having a structured surface geometry corresponding with the microstructured surface of the ceramic by use of the LIGA method wherein a combination of lithography, electroforming and molding is used, shaping the precursor material by introducing the precursor material into the structured mold insert to form a shaped precursor material, rendering said shaped precursor material infusible by chemical crosslinking, and pyrolyzing the shaped precursor material, whereby the ceramic having the microstructured surface is obtained.

\* \* \* \* \*